United States Patent [19]
Lemons et al.

[11] 3,762,083
[45] Oct. 2, 1973

[54] SKY PROJECTOR

[75] Inventors: Thomas M. Lemons, Marblehead, Mass.; Charles Neenan, New York, N.Y.

[73] Assignee: Metropolitan Life Insurance Co., New York, N.Y.

[22] Filed: Aug. 24, 1972

[21] Appl. No.: 283,347

[52] U.S. Cl. .................... 40/130 B, 353/62, 240/1, 40/217
[51] Int. Cl. ............................................. G09f 13/00
[58] Field of Search ....................... 240/23, 24, 10.1, 240/1; 353/29, 36, 84, 62; 40/106.51, 106.52, 130 B

[56] References Cited
UNITED STATES PATENTS

| | | | |
|---|---|---|---|
| 2,055,217 | 9/1936 | Gauthier | 353/62 X |
| 1,619,096 | 3/1927 | Walsh | 40/130 B |
| 3,456,103 | 7/1969 | Bond | 240/102 R X |
| 1,657,878 | 1/1928 | Blair | 353/29 |

FOREIGN PATENTS OR APPLICATIONS

| | | | |
|---|---|---|---|
| 300,409 | 11/1928 | Great Britain | 40/130 B |
| 367,253 | 2/1932 | Great Britain | 353/62 |

*Primary Examiner*—Samuel S. Matthews
*Assistant Examiner*—Richard M. Sheer
*Attorney*—Lester W. Clark et al.

[57] ABSTRACT

A sky projector which simultaneously projects sky images and provides ground level display effects. The sky projector includes a vertical arrangement of a light source comprising several floodlights and several searchlights pointed upwardly to generate substantially vertical beams of light, a rotating umbrella-shaped color wheel having segments of different color and covering the light source, a protective screen covering the color wheel, an image plate disposed at an oblique angle with respect to the beam, and a surrounding wall which has a slanted top surface. The image plate 9 is secured to that slanted top surface, but is spaced therefrom for the purpose of providing special lighting effects. The inwardly facing surface of the surrounding wall is shaped in cross-section to assist in forming the projected sky image. The sky projector forms a sky image which gives the appearance of moving up and down in the sky as the beam from the light source is filtered through different color filters of the rotating color wheel. Additionally, the sky projector, together with peripheral lighting units forms a continuously changing color and shadow display visible at the ground level, and produces an aura effect which causes the image plate to appear floating in space.

1 Claim, 4 Drawing Figures

SKY PROJECTOR

BACKGROUND OF THE INVENTION

The invention is in the field of sky projectors and relates particularly to sky projectors for projecting images on clouds or atmosphere suspended layers of particles and the like, as well as to projectors for ground level images and effects.

The sky projector disclosed in Elion et al. U.S. Pat. No. 2,827,831 comprises, in substantially horizontal alignment, a light source, an image stencil, a projecting element or lens, and an oblique mirror directing upwardly the horizontal beam from the light source. Gauthier U.S. Pat. No. 2,055,217 shows a similar arrangement of a light source, a stencil and a lens, with a stationary color filter interposed between the light source and the stencil. Stabler U.S. Pat. No. 1,837,732 discloses a rotating canopy composed of differently colored glass plates and enclosing a light source. The Stabler device is not a sky projector; it is used to illuminate a water fountain.

The sky projectors discussed above are relatively complex optical structures designed to accommodate different stencil plates for displaying different images under different conditions and at different angles. In contrast, an object of the subject invention is to provide a sky projector which is simple and reliable and which projects a sky image and simultaneously forms a ground level display, and which creates light, shadow, and color effects that are not possible with the prior art sky projectors discussed above.

DETAILED DESCRIPTION

Figure 1:
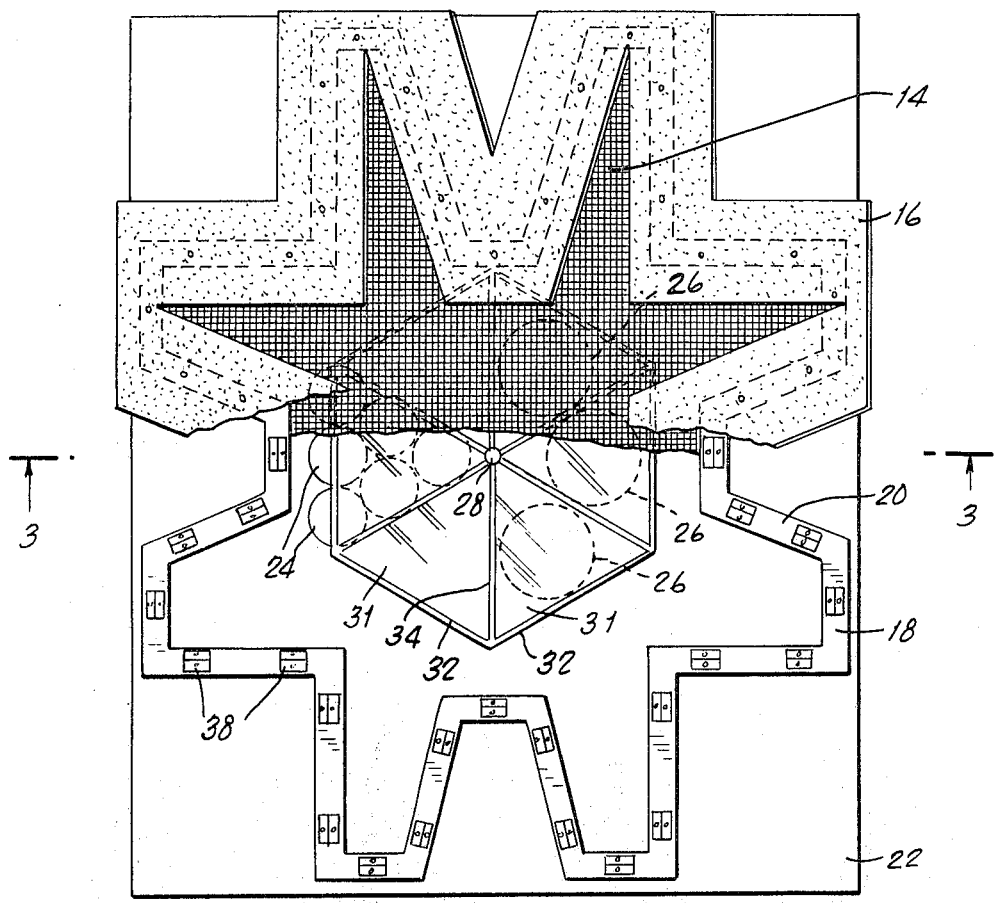
FIG. 1 is a top plan view of a sky projector according to the invention, with parts broken away.
Figure 2:
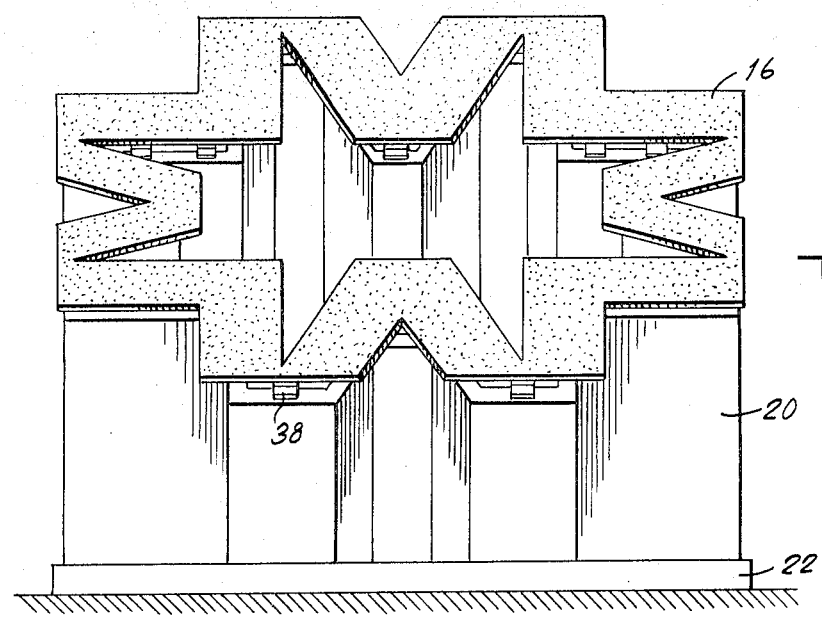
FIG. 2 is a front elevational view of the sky projector.
Figure 3:
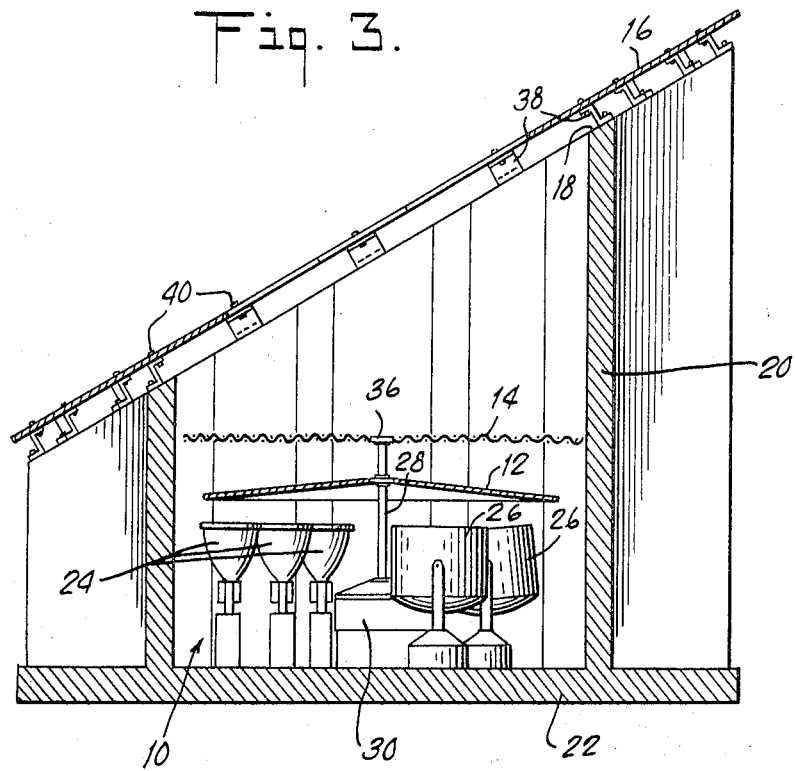
FIG. 3 is a sectional view along line 3—3 of FIG. 1.

Referring to FIGS. 1 through 4, and particularly to FIG. 3, the sky projector comprises a vertical arrangement of a light source generally indicated at 10, an umbrella-shaped color filter 12 disposed above the light source 10, a protective screen 14 disposed above the color filter 12, and an image plate 16 disposed above the protective screen 14 and slanted at an oblique angle with respect to the upwardly directed beam generated by the light source 10. The image plate 16 is spaced from the slanted top surface 18 of a vertical wall 20 which surrounds the vertical arrangement of the light source 10, the color filter 12 and the protective screen 14. The wall 20 extends upwardly from a base plate 22.

The light source 10 comprises a plurality of multi-vapor floodlights 24 and a plurality of Xenon searchlights 26. The searchlights 26 generate the long range beams of light used to project a sky image, while the floodlights 24, in cooperation with the searchlights 26, form a ground level image and cause special ground level effects. The searchlights 26 and the floodlights 24 are suitably affixed to the base plate 22, and are suitably supplied with power for substantially continuous operation at night.

The color wheel 12 is fixedly mounted on a central, vertically extending shaft 28 which is rotated about its longitudinal axis by a motor 30 suitably mounted on the base plate 22. As seen in FIG. 1, the color wheel 12 comprises a hexagonal frame and six triangular segments 31 which may be differently colored glass filters. If desired, each segment may be subdivided into smaller areas, each with a different color. When the color wheel 12 rotates, the sky image gives the appearance of moving up and down depending on the particular color combination rotated over the light source 10. The appearance of vertical motion of the sky image is due to the fact that the penetration characteristics of light into clouds or atmosphere suspended particle layers depend on the color of the light.

In particular, the color wheel 12 comprises a frame having peripheral members 32 connected end to end as the sides of a hexagon, and diagonal members 34 connecting opposite apices of the hexagon formed by the peripheral members 32. The diagonal frame members 34 are secured at their centers to the vertical shaft 28. Each segment of the hexagonal color wheel 12 may contain a color filter of a different color. Alternately, less than six colors may be employed in various combinations. The particular choice of colors employed in the color filter 12 depends on the type of image that is desired. It is important, however, that at least two colors be employed if the sky image is to have the appearance of vertical motion in the sky. It is noted that the color wheel 12 completely covers the searchlights 26 and the floodlights 24 to protect them from water or particle damage. It is also noted that the umbrella-like shape of the color wheel 16 and its rotation help it shed water and dust.

Further, the framework of the color wheel frame is designed so as to provide a changing shadow configuration on the internal wall of the structure as well as affording color changes.

The protective screen 14 is supported at its center by the shaft 28, above the color wheel 12, by means of a suitable bearing 36, so that the protective screen 14 remains stationary while the color wheel 12 is rotating. The peripheral edges of the protective screen 14 may be suitably secured to the support wall 20. The function of the protective screen 14 is to prevent damage to the color wheel 12 and to the light source 10 from objects which may be thrown or which may otherwise enter the space enclosed by the wall 20 through the clearance between the slanted top surface 18 of the wall 20 and the image plate 16. The screen 14 may be slanted to allow objects falling on its upper surface to move downward to its lower edge, which may be provided with suitable openings for the removal of such objects.

Figure 4:
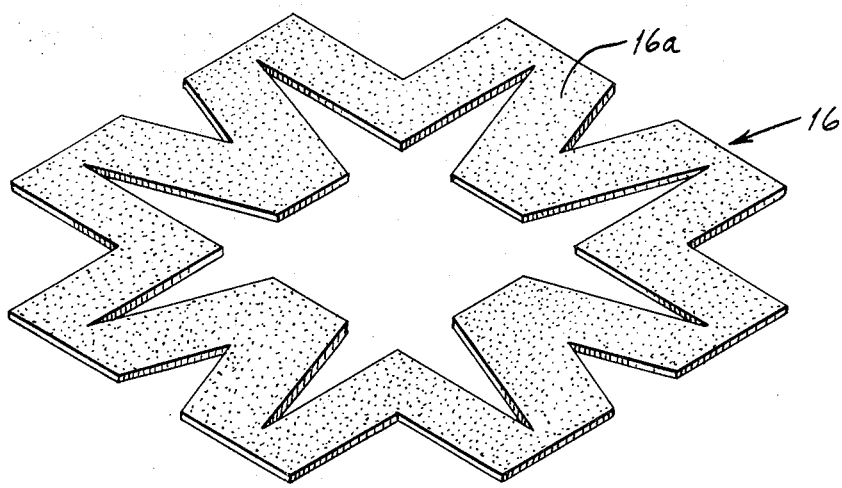
FIG. 4 is a perspective view of the image plate.

The image plate 16, which is shown in perspective view in FIG. 4, may be made of a transparent plastic material such as methyl methacrylate and may have areas of different light transmitting characteristics. The image plate 16 is primarily for ground level effect both during day time and at night. The plate 16, which may be of plastic material is painted on the underside in order to ensure opaqueness of the image plate. In the day time, the image plate 16 provides a blue visual representation of a logo, while at night, when illuminated by the floodlights 24 as well as by the search lights 26, the image plate 16 provides a silhouette of the same logo.

It is noted that the image plate 16 is spaced from the slanted top surface 18 of the support wall 20, with the result that a unique aura effect is created, which gives the image plate 16 the appearance of floating in space.

The image plate 16 is supported on the top of the wall 20 by means of a first plurality of angle irons 38 bolted to the wall, and a second plurality of angle irons 39 bolted to the underside of the image plate 16. The upwardly and downwardly extending flanges of the angle irons are bolted together to hold the image plate in place.

The spacing between the image plate 16 and the top surface 18 of the support wall 20, which may for example be several inches, results in an aura effect around the periphery of the image plate 16. The plate 16 has the appearance of floating in space, especially when observed at night. The floating effect is enhanced by the fact that the plate 16 is wider than the wall 20, and effectively conceals the top of the wall from an observer looking in the direction of FIG. 2.

Referring to FIGS. 1 and 2 in particular, it is seen that the wall 20 is shaped in horizontal section to resemble the shape of the image plate 16. Due to this particular shape, the wall 20 serves the dual function of supporting the image plate 20 and assisting in forming the projected sky image. Due to the specific shape of the wall 20, the light beam from the light source 10 follows the shape represented by the inwardly facing surface of the wall 20 and by the area 16a of the image plate 16. The inwardly facing surface of the wall 20 limits the lateral dispersal of the beam and thus assists in forming the sky image projected by the sky projector. Further, the folded configuration of the vertical wall contributes to the effectiveness of continuously changing light and shadow effects displayed on the inside wall, as viewed from ground level.

In one particular embodiment, the base plate 22 is a square approximately 22 feet wide, the wall 20 has a minimum height of 6 feet and a maximum height of 18 feet, and the image plate 16 is spaced from the top sloping surface 18 of the wall 20 by about 6 to 8 inches. The light source 10 includes 3 Xenon searchlights 26, and 6 multivapor floodlights 24. With such configuration, the sky projector becomes a landmark display which can be viewed, depending on the availability of adequate cloud cover and sufficient moisture, or other suspended particles, in the air, from hundreds of miles away at night from an airplane, and can be viewed from tens of miles on the ground level.

A specific feature of the subject invention is that the sky projection simultaneously forms an image projected on the cloud cover, and a dynamic display visible at ground level. Specifically, when the light source 10 is turned on to generate an upwardly directed beam of light, the combination of the particularly shaped wall 20 and the image plate 16 cooperates to form a similarly shaped defocused sky image. Additionally, because the image plate 16 is slanted with respect to the beam and with respect to the base plate 22, the plate is visible from the ground, and a ground level image is formed.

Another particular feature of the subject invention is that an aura effect is created around the periphery of the image plate 16. This effect accentuates the image on the image plate 16 ahd gives it the appearance of floating in space at night.

An additional feature of the subject invention results from the rotation of the color wheel 12. When the color wheel 12 has filters of two or more colors, the sky image gives the appearance of moving up and down in space as the color wheel 12 rotates. The apparent motion is due to the fact that light of different colors has different capacity of penetrating clouds and atmosphere suspended particles. A specific advantage may result under certain atmospheric conditions when projected images of certain colors may not be adequately visible. Under such conditions, projected sky images or other colors, as filtered by color wheel 12 may result in adequately visible images, and at least an intermittent sky image may be present.

We claim:
1. A sky projector including:
   a. light source means for generating an upwardly directed beam of light;
   b. a wall surrounding the light source means, said wall having an upper surface slanted with respect to the light beam; and
   c. image plate means spaced above the upper surface of said wall and parallel to said upper surface, said image plate means being wider than the upper surface of the wall so that it overhangs the edges thereof and at least partially conceals said edges from a viewer looking horizontally at said upper surface, so that said image plate means appears to float when illuminated by the peripheral portion of said beam.

* * * * *